US008625274B2

(12) United States Patent  
Lin

(10) Patent No.: US 8,625,274 B2
(45) Date of Patent: Jan. 7, 2014

(54) COMPUTER CASING

(75) Inventor: Tai-Wei Lin, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 104 days.

(21) Appl. No.: 13/306,854

(22) Filed: Nov. 29, 2011

(65) Prior Publication Data

US 2013/0083478 A1 Apr. 4, 2013

(30) Foreign Application Priority Data

Sep. 30, 2011 (TW) ............................. 100135653 A

(51) Int. Cl.  
*G06F 1/20* (2006.01)

(52) U.S. Cl.  
USPC ................................. 361/679.51; 361/679.46

(58) Field of Classification Search  
USPC ......................................... 361/679.46–679.54  
See application file for complete search history.

(56) References Cited

U.S. PATENT DOCUMENTS

| | | | | |
|---|---|---|---|---|
| 6,181,557 | B1* | 1/2001 | Gatti | 361/695 |
| 6,301,108 | B1* | 10/2001 | Stockbridge | 361/688 |
| 6,896,612 | B1* | 5/2005 | Novotny | 454/184 |
| 7,031,154 | B2* | 4/2006 | Bash et al. | 361/690 |
| 7,201,651 | B2* | 4/2007 | Su | 454/184 |
| 7,238,104 | B1* | 7/2007 | Greenslade et al. | 454/184 |
| 7,245,485 | B1* | 7/2007 | Morrell | 361/679.48 |
| 7,247,089 | B2* | 7/2007 | Crippen et al. | 454/184 |
| 7,545,639 | B2* | 6/2009 | Ridge | 361/690 |
| 7,549,917 | B2* | 6/2009 | Henry et al. | 454/184 |
| 7,674,165 | B2* | 3/2010 | Lu et al. | 454/184 |
| 7,724,516 | B2* | 5/2010 | Harder et al. | 361/679.51 |
| 7,952,870 | B1* | 5/2011 | Zhou | 361/695 |
| 7,983,038 | B2* | 7/2011 | Levesque et al. | 361/692 |
| 8,000,100 | B2* | 8/2011 | Kao et al. | 361/695 |
| 8,004,648 | B2* | 8/2011 | Dunn | 349/161 |
| 8,248,783 | B2* | 8/2012 | Huang | 361/679.5 |
| 8,248,793 | B2* | 8/2012 | Bash et al. | 361/695 |
| 2004/0252453 | A1* | 12/2004 | Brooks et al. | 361/687 |
| 2005/0011208 | A1* | 1/2005 | Dobbs et al. | 62/178 |
| 2005/0168940 | A1* | 8/2005 | Askeland et al. | 361/687 |
| 2008/0055846 | A1* | 3/2008 | Clidaras et al. | 361/687 |
| 2008/0218969 | A1* | 9/2008 | Muraki | 361/695 |
| 2009/0219679 | A1* | 9/2009 | Moore et al. | 361/679.31 |
| 2010/0085707 | A1* | 4/2010 | Moss | 361/695 |
| 2011/0043995 | A1* | 2/2011 | Chen et al. | 361/679.55 |
| 2011/0058326 | A1* | 3/2011 | Idems et al. | 361/679.21 |
| 2011/0141684 | A1* | 6/2011 | Klarer | 361/679.33 |
| 2012/0087085 | A1* | 4/2012 | Moore et al. | 361/679.46 |

\* cited by examiner

*Primary Examiner* — Adrian S Wilson

(74) *Attorney, Agent, or Firm* — Altis Law Group, Inc.

(57) ABSTRACT

A computer host includes a casing, a number of fans, at least two temperature sensors, and a controller. The casing includes a top portion and a bottom portion. The bottom portion includes a first sidewall, a second sidewall, a third sidewall, and a forth sidewall. The at least two temperature sensors are positioned on the first sidewall and one or more of the other sidewalls and the top portion to sense the local temperature. The controller stores a threshold value, and when the temperature difference between the first sidewall on the one hand and the temperature of any one of the other sidewalls or the top portion is less than the threshold value, the controller turns off at least one fan.

7 Claims, 4 Drawing Sheets

COMPUTER CASING

BACKGROUND

1. Technical Field

The present disclosure relates to computer casings and, particularly, to a computer casing with the ability to intelligently use the cooling power of fans.

2. Description of Related Art

The cooling systems of some desktop computers may run at full speed all the time when the desktop computers are working, even when the computer does not need so much cooling power. It is a waste of power.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
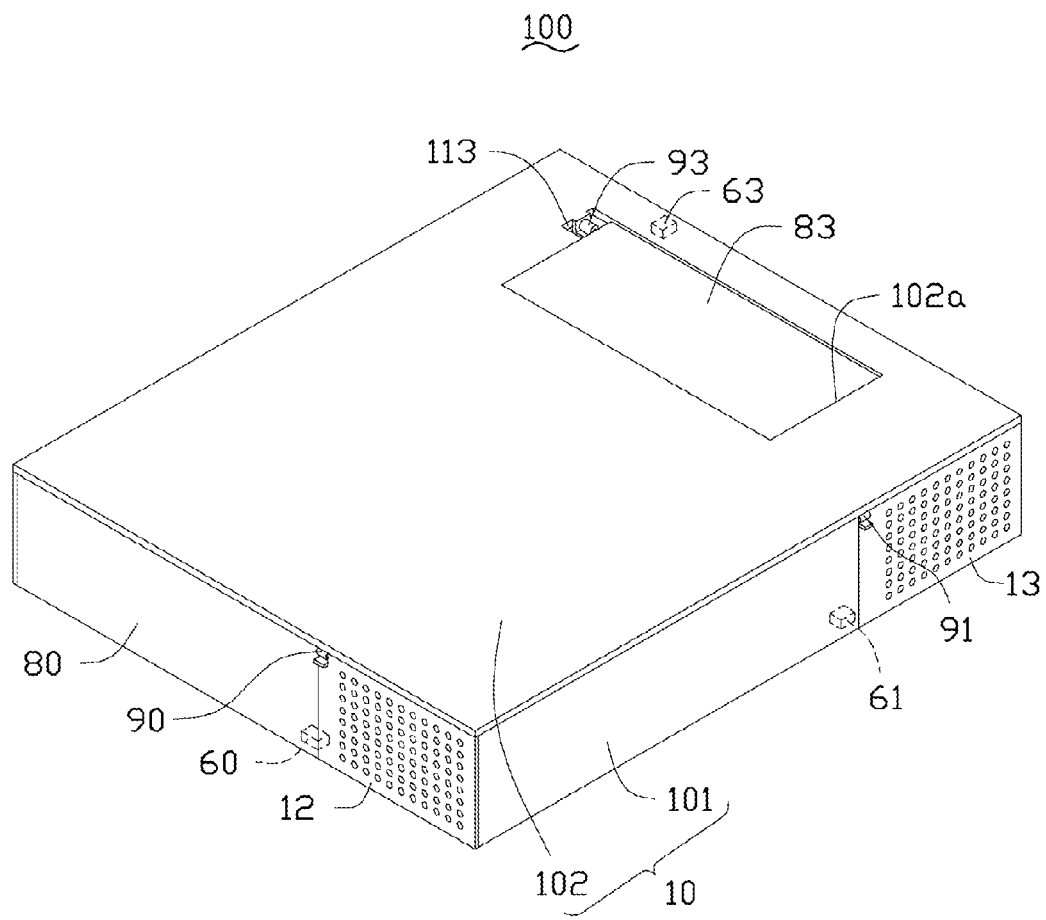
FIG. 1 is an isometric view of a computer casing in accordance with an exemplary embodiment.
Figure 2:
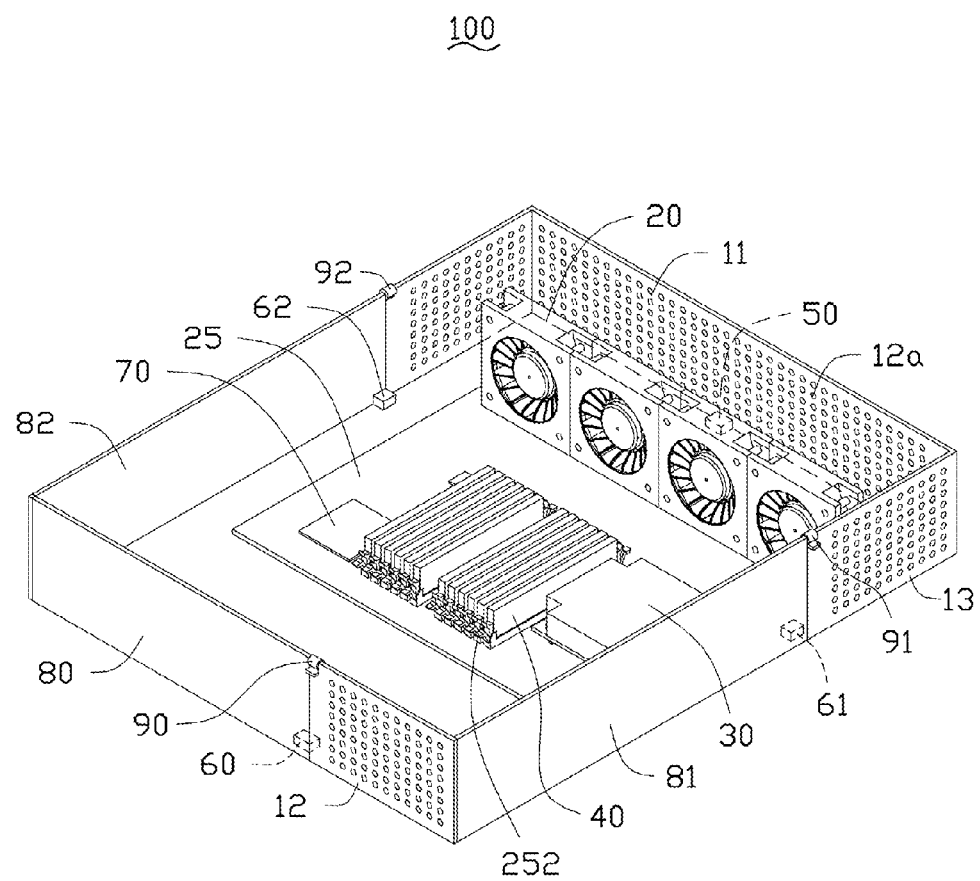
FIG. 2 is an isometric view of the bottom portion and the components received in the bottom portion of the computer casing shown as FIG. 1, in accordance with an exemplary embodiment.
Figure 3:
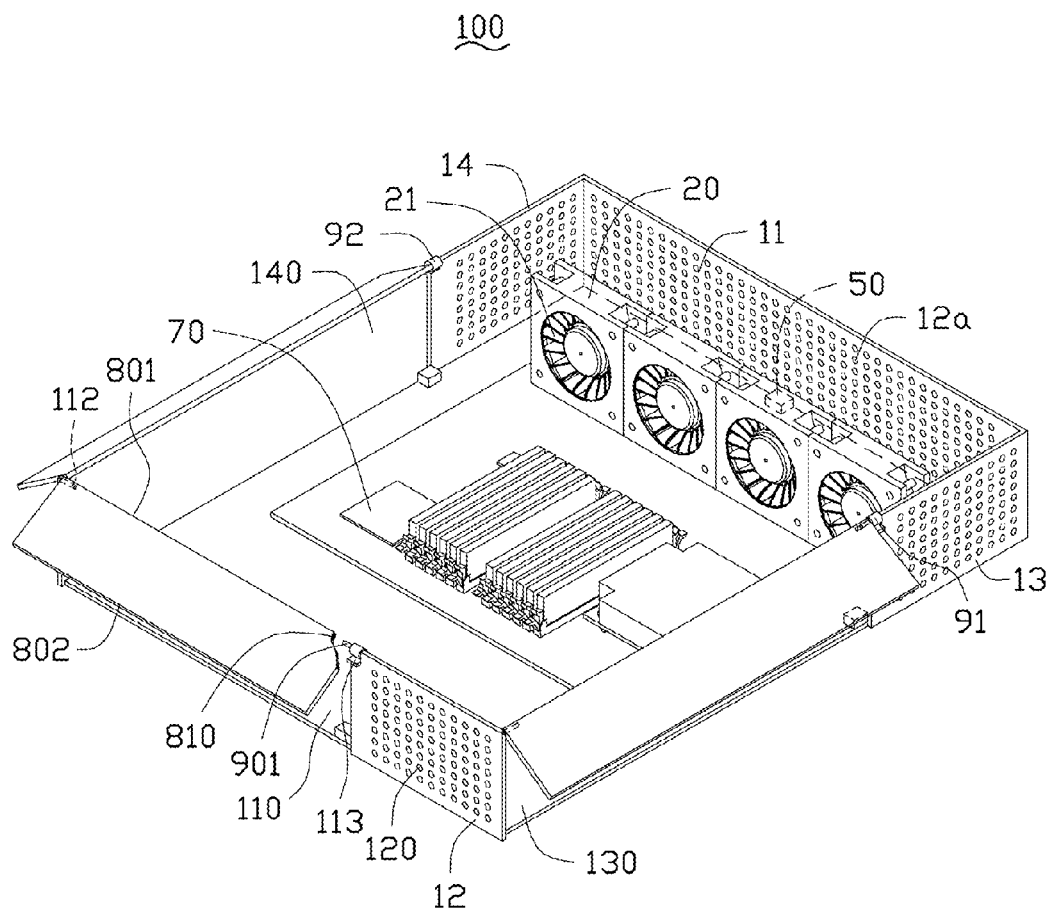
FIG. 3 is an isometric view of the computer casing in FIG. 2, but showing a different state.

Referring to FIGS. 1-3, a computer casing 100 includes a housing 10, four fans 20, a main board 25, a central processing unit (CPU) 30, a number of memories 40, a first temperature sensor 50, a second temperature sensor 60, a third temperature sensor 61, a forth temperature sensor 62, a fifth temperature sensor 63, a controller 70, a first rotatable plate 80, a second rotatable plate 81, a third rotatable plate 82, a forth rotatable plate 83, a first motor 90, a second motor 91, a third motor 92, and a forth motor 93.

The casing 10 is hollow and includes a bottom portion 101 and a top portion 102. The bottom portion 101 includes a first sidewall 11, a second sidewall 12 parallel to the first sidewall, a third sidewall 13 connected to the first sidewall 11 and the second sidewall 12, and a forth sidewall 14 parallel to the third sidewall 13 and connected to the first sidewall 11 and the second sidewall 12. The fans 20, the main board 25, the CPU 30, the memories 40, the temperature sensors 50, 60, 61, and 62, the controller 70, the rotatable plates 80, 81, and 82, and the motors 90, 91, and 92 are all received in the bottom portion 101. The main board 25 includes a number of sockets 252 to receive the memories 40.

In this embodiment, at least one of the three sidewalls defines a number of vents 120. The second sidewall 12 further defines a first opening 110 adjacent to the forth sidewall 14. The third sidewall 13 defines a second opening 130 adjacent to the second sidewall 12, and the forth sidewall 14 defines a third opening 140 adjacent to the second sidewall 12. The top portion 102 defines a fifth opening 102a. The four fans 20 are arranged adjacent to the first sidewall 11, with the intake side of the fans 20 adjacent to and facing the first sidewall 11 and the exhaust side of the fans 20 facing the second sidewall 12.

The four temperature sensors 50, 60, 61 and 62 are respectively positioned on the four sidewalls 11, 12, 13 and 14 and used to detect the temperature of the four sidewalls 11, 12, 13 and 14. The fifth temperature sensor 63 is positioned on the top portion 102 to detect the temperature of the top portion 102. In this embodiment, the five temperature sensors are thermistors.

The first rotatable plate 80 includes a first, top edge 801 and a second, bottom edge 802 opposite the first edge 80. The second edge 802 is unconstrained. The two opposite ends of the first edge 801 both define a through hole 810. The structure of the other three rotatable plates 81, 82, and 83 is the same as that of the first rotatable plate 80. In this embodiment, the area of the rotatable plates 80, 81, 82, and 83 is equal to that of the corresponding openings 110, 130, 140, and 102a. The second sidewall 12, the third sidewall 13, the forth sidewall 14, and the top portion 102 each include a projecting shaft 112 and define a cut-out 113 at the two opposite ends of the corresponding openings 110, 130, 140, and 102a.

Each of the four motors 90, 91, 92, and 93 is received in a cut-out 113. Each of the four motors 90, 91, 92, and 93 includes a rotatable shaft 901. The rotatable shaft 901 of the first motor 90 is inserted into one of the two through holes 810 of the first rotatable plate 80. The projecting shaft 112 of the first opening 110 is received in the other through hole 810 of the first rotatable plate 80. Thus, the first rotatable plate 80 can be driven by the motor 90 to rotate about the rotatable shaft 901. The other three motors 91, 92, 93 and the rotatable plates 81, 82, 83 are arranged in the same manner as mentioned above.

Figure 4:
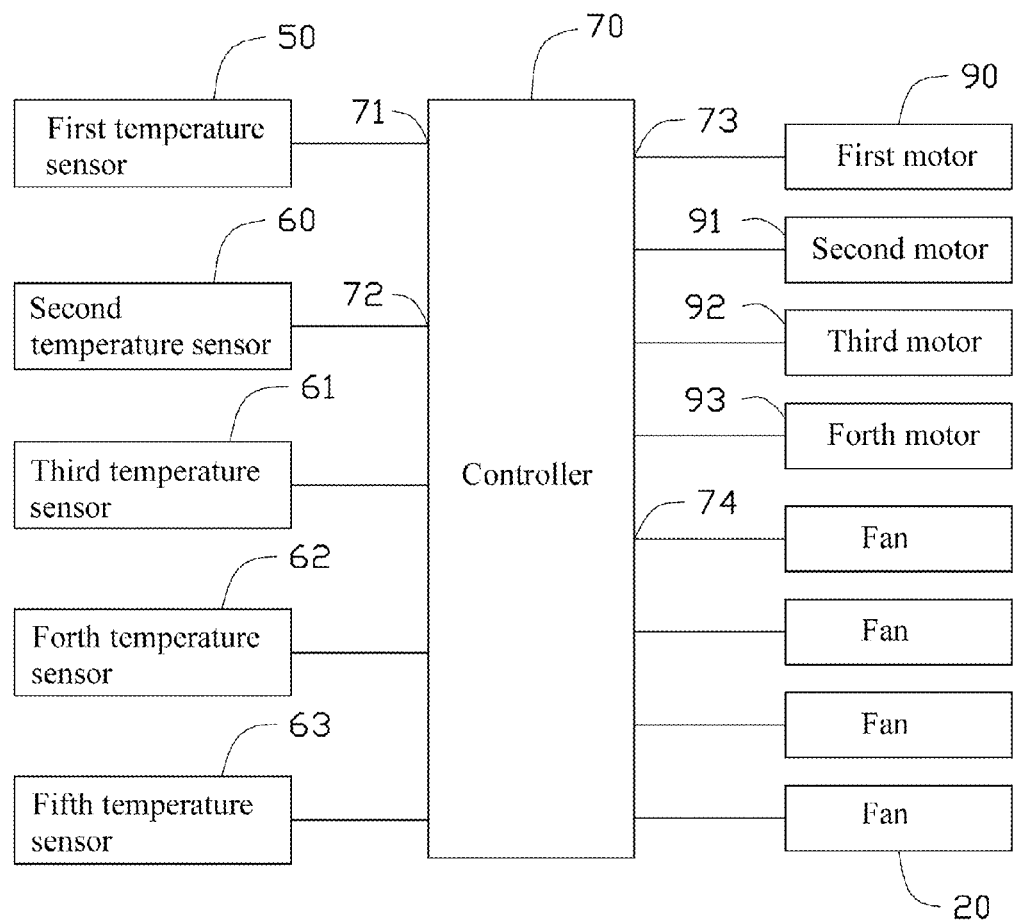
FIG. 4 is a block diagram of components employed to cool the computer casing of FIG. 1, in accordance with an exemplary embodiment.

Referring to FIG. 4, the controller 70 is arranged on the main board 25. The controller 70 includes a first input port 71, four second input ports 72, four first output ports 73, and four second output ports 74. The first input port 71 is electrically connected to the first temperature sensor 50. The four input ports 72 are each electrically connected to a temperature sensor 60, 61, 62 and 63. The four first output ports 73 are respectively electrically connected to the four motors 90-93. The four second output ports 74 are respectively electrically connected to the four fans 20.

In use, the five temperature sensors 50, 60, 61, 62, and 63 respectively detect the temperature of the sidewalls 11, 12, 13, 14, and the top portion 102 according to their respective locations, and transmit the detected temperature to the controller 70 through the first input port 71 and the four second input ports 72. The controller 70 further stores a threshold value. The controller 70 computes any differences between the detected temperature of the first sidewall 11 on the one hand and the detected individual temperatures of the other three sidewalls 12, 13, 14 and the top portion 102 on the other hand.

If it is determined that all of the temperature differences is equal or greater than the threshold value, the controller 70 actuates the four motors 90, 91, 92, and 93 to respectively drive, in a first direction, the first plate 80, the second plate 81, the third plate 82, and the forth plate 83 to rotate from a closed position as shown in FIGS. 1 and 2, to an open position as shown in FIG. 3, thereby increasing and enhancing the efficiency of the dissipation of heat from within the housing 10. Simultaneously, the controller 70 also controls the four fans 20 to run at the same time.

If it is determined that any of the before mentioned temperature differences is less than the threshold value, the controller 70 actuates at least one of the four motors 90-93 to rotate in a second direction, and drive the at least one of the four plates 80, 81, 82, and 83 (corresponding to the actuated motor(s)) to rotate from the open position to the closed position to cover the corresponding at least one of the openings 110, 130, 140, and 102a. Simultaneously, the controller 70 also stops supplying power to at least one of the four fans 20 to save power.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A computer casing comprising:
  a housing comprising a top portion and a bottom portion, the bottom portion comprising a first sidewall, a second sidewall, a third sidewall, and a forth sidewall, the second sidewall paralleling to the first sidewall, the third sidewall being connected to the first sidewall and the second sidewall, the forth sidewall paralleling to the third sidewall and being connected to the first sidewall and the second sidewall;
  a plurality of fans arranged adjacent to the first sidewall with the intake side of the fans facing the first sidewall and the exhaust side of the fans facing the second sidewall;
  at least two temperature sensors respectively arranged on the first sidewall and one or more of the second sidewall, the third sidewall, the fourth sidewall and the top portion, and configured to detect temperature of the first sidewall and one or more of the second sidewall, the third sidewall, and the fourth sidewall and the top portion; and
  a controller electrically connected with the plurality of fans and the at least two temperature sensors to monitor the temperature of the first sidewall, and one or more of the second sidewall, the third sidewall, the fourth sidewall and the top portion;
  wherein if the controller determines that any of temperature differences between the first sidewall and at least one of the second sidewall, the third sidewall, the fourth sidewall, or the top portion is less than a preset value, the controller controls to turn off at least one of the fans.

2. The computer casing as described in claim 1, wherein the at least one of the second sidewall, the third sidewall, the forth sidewall or the top portion further defines an opening, at least one rotatable plate is rotatably connected to the at least one of the second sidewall, the third sidewall, the forth sidewall or the top portion respectively corresponding to the opening to rotate to cover or expose the openings.

3. The computer casing as described in claim 2, wherein each of the at least one rotatable plate comprises a top edge and a bottom edge, two opposite ends of the top edge both define a through hole, each of the at least one of the second sidewall, the third sidewall, the forth sidewall and the top portion further defines a cut-out and a projecting shaft, the cut-out and the projecting shaft are respectively arranged on the two opposite ends of the opening, at least one motor each of which comprises a rotatable shaft is respectively received in the at least one cut-out and electrically connected to the controller, the rotatable shaft of the at least one motor is inserted into one of the two through hole of corresponding rotatable plate, and the projecting shaft is received in another one of the two through hole of the corresponding rotatable plate, thus the at least one rotatable plate can be driven by at least one the motor to rotate.

4. The computer casing as described in claim 3, wherein after determining any of the temperature differences between the first side wall and at least one of the second sidewall, the third sidewall, the forth sidewall, or the top portion is less than the preset value, the controller actuates the at least one motor to cause the rotatable shaft to rotate to respectively drive the corresponding at least one rotatable plate rotate from an open position to an closed position to cover the at least one corresponding opening.

5. The computer casing as described in claim 3, wherein after determining the temperature differences between the first side wall and at least one of the second sidewall, the third sidewall, the forth sidewall, or the top portion is equal or greater than the preset value, the controller actuates the at least one motor to cause the rotatable shaft to rotate to respectively drive the corresponding at least one rotatable plate rotate from an closed position to an open position to expose the corresponding opening.

6. The computer casing as described in claim 1, wherein the at least two temperature sensors are thermistors.

7. The computer casing as described in claim 1, wherein at least one of the four sidewalls defines a plurality of vents.

* * * * *